(12) United States Patent
Guo et al.

(10) Patent No.: US 11,964,229 B1
(45) Date of Patent: Apr. 23, 2024

(54) STAGGERED AND CROSSED HEAT STORAGE ADSORPTION BED AND SEAWATER DESALINATION WASTE HEAT STORAGE SYSTEM

(71) Applicant: Energy Research Institute Of Shandong Academy Of Sciences, Jinan (CN)

(72) Inventors: Lin Guo, Jinan (CN); Cong Wang, Xintai (CN); Zhigang Liu, Jinan (CN); Guihua Tang, Xi'an (CN); Yawei Yang, Xi'an (CN); Chongliang Huang, Jinan (CN); Zhuoliang Li, Weifang (CN); Yalong Kong, Qufu (CN)

(73) Assignee: ENERGY RESEARCH INSTITUTE OF SHANDONG ACADEMY OF SCIENCES, Jinan (CN)

( * ) Notice: Subject to any disclaimer, the term of this patent is extended or adjusted under 35 U.S.C. 154(b) by 0 days.

(21) Appl. No.: 18/328,353

(22) Filed: Jun. 2, 2023

(30) Foreign Application Priority Data

Jan. 3, 2023 (CN) .......................... 202310000648.8

(51) Int. Cl.
    *B01D 5/00* (2006.01)
    *B01D 1/00* (2006.01)
    (Continued)

(52) U.S. Cl.
    CPC ......... *B01D 5/0039* (2013.01); *B01D 1/0035* (2013.01); *B01D 5/0027* (2013.01);
    (Continued)

(58) Field of Classification Search
    CPC .... B01D 5/0039; B01D 1/0035; B01D 5/006; B01D 5/009; C02F 1/14; C02F 2103/08;
    (Continued)

(56) References Cited

U.S. PATENT DOCUMENTS

| 3,204,693 A | 9/1965 | Kuhn |
| 4,285,702 A | 8/1981 | Helmut |
| (Continued) | | |

FOREIGN PATENT DOCUMENTS

| CN | 2935066 Y | 8/2007 |
| CN | 101033105 A | 9/2007 |
| (Continued) | | |

Primary Examiner — Renee Robinson
(74) Attorney, Agent, or Firm — Rachel Pilloff; Sean Passino; Pilloff Passino & Cosenza LLP

(57) ABSTRACT

A staggered and crossed heat storage adsorption bed and a seawater desalination waste heat storage system are provided, which relate to the field of seawater desalination and the technical field of thermochemical adsorption heat storage. The adsorption bed includes a bed body, wherein an adsorption cavity is arranged in the bed body; two sides of the adsorption cavity are respectively communicated with an inlet cavity and an outlet cavity; the adsorption cavity includes a vacuum heat insulation layer arranged at an outermost side; the vacuum heat insulation layer is embedded with an adsorption box fixing layer; a corner end adsorption box, a central adsorption box and a side adsorption box are staggered and crossed arranged in an inner cavity of the vacuum heat insulation layer through the adsorption box fixing layer.

7 Claims, 3 Drawing Sheets

(51) Int. Cl.
*C02F 1/14* (2023.01)
*F28D 20/00* (2006.01)
*C02F 103/08* (2006.01)

(52) U.S. Cl.
CPC ........... *B01D 5/0051* (2013.01); *B01D 5/006* (2013.01); *B01D 5/009* (2013.01); *C02F 1/14* (2013.01); *F28D 20/003* (2013.01); *C02F 2103/08* (2013.01); *C02F 2303/10* (2013.01); *F28D 2020/0008* (2013.01); *F28D 2020/0069* (2013.01)

(58) Field of Classification Search
CPC ............... C02F 2303/10; F28D 20/003; F28D 2020/0008; F28D 2020/0069
See application file for complete search history.

(56) References Cited

U.S. PATENT DOCUMENTS

| | | | |
|---|---|---|---|
| 7,793,651 B2 * | 9/2010 | Sawada | ................ F24H 7/0433 126/618 |
| 2017/0363373 A1 | 12/2017 | Cai | |
| 2022/0290929 A1 * | 9/2022 | Doerbeck | ........... F28D 20/0056 |

FOREIGN PATENT DOCUMENTS

| | | | | |
|---|---|---|---|---|
| CN | 109798762 A | 5/2019 | | |
| CN | 110822967 A | 2/2020 | | |
| CN | 114963825 A | 8/2022 | | |
| DE | 3906241 A1 | 8/1990 | | |
| EP | 2 781 871 | * | 3/2014 | ........... F28D 20/003 |
| JP | 2003202166 A | 7/2003 | | |
| WO | 2017026621 A1 | 2/2017 | | |

\* cited by examiner

STAGGERED AND CROSSED HEAT STORAGE ADSORPTION BED AND SEAWATER DESALINATION WASTE HEAT STORAGE SYSTEM

CROSS-REFERENCE TO RELATED APPLICATIONS

This application claims priority to Chinese Patent Application No. 202310000648.8, filed on Jan. 3, 2023, the contents of which are hereby incorporated by reference.

TECHNICAL FIELD

The application relates to the field of seawater desalination and the technical field of thermochemical adsorption heat storage, and in particular to a staggered and crossed heat storage adsorption bed and a seawater desalination waste heat storage system.

BACKGROUND

The ocean is the source of life and a vital resource for human survival. However, the world is facing a crisis of population growth, resource depletion and environmental degradation, which poses serious challenges to the water supply and demand balance. The contradiction between water supply demand and resources is gradually serious, and the utilization of seawater resources is highly valued. However, the desalination process is accompanied by a lot of energy waste, such as the heat loss caused by steam condensation during distillation, and people begin to focus on the utilization of marine clean energy and marine renewable energy. The reason is the lack of science and technology of low-grade energy recovery and the rational allocation of energy. On the one hand, human demand for energy is increasing; on the other hand, most energy sources, such as solar energy, geoheat energy and industrial waste heat, are discontinuous and instable, and in many cases people cannot make rational use of these energy sources. For example, the heat generated in the process of seawater desalination is wasted without being used, but it may not be provided in time when the heat is urgently needed; sometimes a large part of the supplied heat is lost as waste heat and so on. Heat storage technology may be used to solve the problem of waste heat and residual heat recycling and the mismatch contradiction between heat energy supply and demand. Heat energy storage technology can be applied to various energy sources, such as solar energy, geothermal energy and industrial waste heat, which are usually intermittent and unstable. At present, heat storage technology has a wide range of applications in different fields.

Common heat storage methods include sensible heat storage, latent heat storage and thermochemical heat storage. Compared with sensible heat storage and latent heat storage, thermochemical heat storage has extremely high theoretical heat storage density, negligible heat loss and seasonal heat storage potential, which may provide a suitable solution for long-term heat storage in a more compact and efficient way. In sensible heat storage, the heat storage density is low, only about 0.2 $GJ/m^3$, which has the largest storage capacity demand, large heat loss, simplicity, high reliability and low maintenance and installation cost. The commonly used heat storage medium in commerce is water, which is widely used in housing and industry. Latent heat storage stores energy through phase change materials, and the energy storage density is moderate, generally 0.3-0.5 $GJ/m^3$, which provides a relatively compact and cost-effective storage scheme. The main limitations of the latent heat storage are low thermal conductivity, volume expansion of storage medium when phase change occurs, corrosion compatibility, supercooling, phase segregation and material degradation. Thermochemical energy storage stores energy through thermochemical materials, with a high energy storage density of 0.5-3 $GJ/m^3$, and almost no energy loss during storage, which is suitable for short-term and long-term storage. The challenges of the thermochemical energy storage mainly include the change of storage medium (such as agglomeration, volume expansion, deliquescence, sintering, chemical and physical degradation during operation, etc.), the structural stability of devices, the limitation of heat and mass transfer, and the difficulty in achieving high reaction conversion rate and high reaction rate.

Therefore, it is urgent to design a staggered and crossed heat storage adsorption bed and a seawater desalination waste heat storage system.

SUMMARY

The application aims to provide a staggered and crossed heat storage adsorption bed and a seawater desalination waste heat storage system, so as to solve the problems existing in the prior art.

In order to achieve the above objectives, the application provides the following scheme: the application provides a staggered and crossed heat storage adsorption bed, which includes a bed body, wherein an adsorption cavity is arranged in the bed body; two sides of the adsorption cavity are respectively communicated with an inlet cavity and an outlet cavity; the adsorption cavity includes a vacuum heat insulation layer arranged at an outermost side; and the vacuum heat insulation layer is embedded with an adsorption box fixing layer;

a corner end adsorption box, a central adsorption box and a side adsorption box are staggered and crossed arranged in an inner cavity of the vacuum heat insulation layer through the adsorption box fixing layer; the corner end adsorption box, the central adsorption box and the side adsorption box are all used for filling adsorption substrates;

the adsorption cavity includes a heat storage state, dry-hot gas first enters a first layer adsorption formed by the corner end adsorption box and the central adsorption box from the inlet cavity, and then diffuses along an airflow direction to enter a second layer adsorption formed by the side adsorption box according to an air diffusion principle; the first layer adsorption and the adjacent second layer adsorption form an adsorption group; the dry-hot gas flows out of the outlet cavity after circulating and alternating through a plurality of adsorption groups.

The vacuum heat insulation layer is composed of a double-layer stainless steel structure, and a middle cavity of the double-layer stainless steel is under vacuum negative pressure.

The adsorption box fixing layer includes a plurality of baffles perpendicular to the inner wall of the vacuum heat insulation layer;

the inner cavity of the vacuum heat insulation layer is a regular polygon structure; the corner end adsorption box is arranged at an included angle of adjacent inner walls of the vacuum heat insulation layer, and the corner end adsorption box is fixedly arranged between the two baffles with a shortest distance between the adjacent inner walls of the vacuum heat insulation layer.

One side of a plurality of corner end adsorption boxes close to a center of the inner cavity of the vacuum heat insulation layer is fixedly provided with the central adsorption box through the baffle; and the central adsorption box and the corner end adsorption boxes are arranged on a same end face; a peripheral wall of the central adsorption box is sequentially staggered and crossed with a side adsorption box through the baffles.

Each side of the corner end adsorption box, the central adsorption box and the side adsorption box is a hollow metal mesh surface.

The staggered and crossed heat storage adsorption bed also includes an exothermic state, wherein wet air first enters the first layer adsorption formed by the corner end adsorption box and the central adsorption box from the inlet cavity, then enters second layer adsorption formed by the side adsorption box, and flows out of the outlet cavity after circulating and alternating through a plurality of adsorption groups.

A seawater desalination waste heat storage system, including a solar seawater distiller, a condenser, a condensed water storage device, an atomizer and an adsorption bed; the adsorption bed is a staggered and crossed heat storage adsorption bed.

A front end of the solar seawater distiller is fixedly connected with a first fan, and a tail end of the solar seawater distiller is communicated with a front end of the condenser; a front end outside a condenser tube of the condenser is also communicated with a second fan; an out tail end of the condenser tube of the condenser is communicated with the inlet cavity of the adsorption bed through a first pipeline;

The condenser tube of the condenser extends into the condensed water storage device; the condensed water storage device is communicated with the atomizer through a switch valve; the atomizer is communicated with the inlet cavity of the adsorption bed through a second pipeline.

A first flow regulating valve and a first flowmeter are arranged on the first pipeline.

A second flow regulating valve and a second flowmeter are arranged on the second pipeline.

The application discloses the following technical effects.

Firstly, low-grade energy is fully utilized, and the resource utilization rate is improved.

The waste of resources may be effectively reduced by storing the latent heat of phase change released in the process of water vapor condensation. In this application, the solar energy is captured and distilled in seawater, and then the heat released during the condensation of distilled water is collected. In terms of energy, the conversion process from solar energy to heat energy and heat energy to chemical energy is completed. In terms of matter, the transformation from mixture to purity has been completed.

Secondly, the heat storage density is high and the heat loss during the storage is small.

Compared with sensible heat storage and latent heat storage, thermochemical heat storage has extremely high theoretical heat storage density, negligible heat loss and seasonal heat storage potential, which may provide a suitable solution for long-term heat storage in a more compact and efficient way.

Thirdly, the thermochemical heat storage reaction rate is fast and the reaction is thorough.

Compared with the commonly used horizontal adsorption bed and vertical adsorption bed, an adjustable staggered and crossed adsorption bed has a larger effective reaction area, and the theoretical reaction rate is 3-4 times faster than the former. In the exothermic process, wet air will form a condensation layer in the middle of the adsorption medium after entering the adsorption cavity, which hinders the continuation of the reaction. The multi-faceted reaction design of the adsorption bed greatly reduces the probability of forming a condensation layer in the middle of the adsorption medium and may improve the recyclability of the adsorption material.

Fourthly, the heat storage efficiency is high and the heat utilization rate is high.

Compared with staggered adsorption bed, an adjustable staggered and crossed adsorption bed has higher absorption efficiency for hot air. When the staggered adsorption bed is used for heat storage, nearly 40% of the hot air escapes through the staggered nodes of the staggered adsorption bed. When the adsorption matrix at the staggered nodes is completely reacted, but the central adsorption matrix has not yet reacted, the escape percentage of the hot air will continue to increase. An adjustable staggered and crossed adsorption bed moves the staggered nodes forward, which hinders the escape of hot air and improves the absorption efficiency of the adsorption matrix for hot air.

Fifthly, it has strong variability and expansibility.

An adjustable staggered and crossed adsorption bed is composed of an adsorption box fixing layer and various adsorption boxes, and is convenient to use without bolts and nuts. In practical application, users may appropriately lengthen the size of the adsorption box fixing layer, increase the number of adsorption boxes and increase the heat storage to achieve the experimental objective.

BRIEF DESCRIPTION OF THE DRAWINGS

In order to explain the embodiments of the present application or the technical scheme in the prior art more clearly, the drawings needed in the embodiments will be briefly introduced below. Obviously, the drawings in the following description are only some embodiments of the present application. For ordinary people in the field, other drawings may be obtained according to these drawings without paying creative labor.

DETAILED DESCRIPTION OF THE EMBODIMENTS

Figure 1:
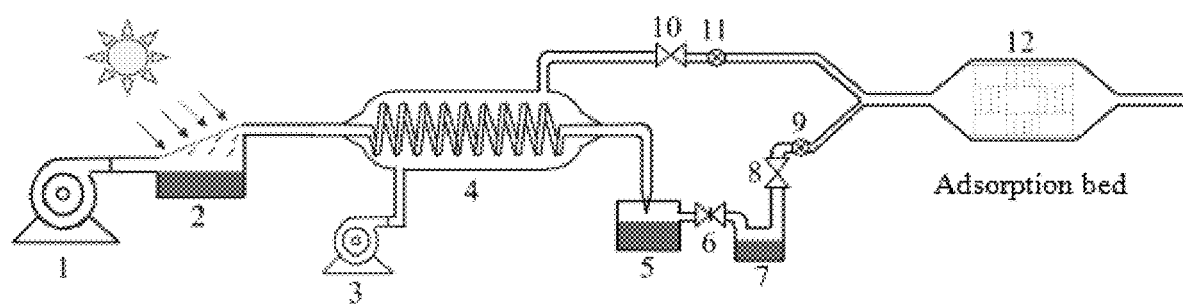
FIG. 1 is a schematic flow diagram of the present application.

In the following, the technical scheme in the embodiment of the application will be clearly and completely described with reference to the attached drawings. Obviously, the described embodiments are only a part of the embodiment of the application, but not the whole embodiments. Based on the embodiments in the present application, all other embodiments obtained by ordinary technicians in the field without creative labor belong to the scope of protection of the present application.

In order to make the above objectives, features and advantages of the present application more obvious and easier to understand, the present application will be further described in detail with the drawings and specific embodiments.

The application provides a staggered and crossed heat storage adsorption bed, which includes a bed body, wherein an adsorption cavity is arranged in the bed body; two sides of the adsorption cavity are respectively communicated with an inlet cavity and an outlet cavity; the adsorption cavity includes a vacuum heat insulation layer 13 arranged at an outermost side; the vacuum heat insulation layer 13 is embedded with an adsorption box fixing layer 14;

a corner end adsorption box 15, a central adsorption box 16 and a side adsorption box 17 are staggered and crossed arranged in an inner cavity of the vacuum heat insulation layer 13 through the adsorption box fixing layer 14; the corner end adsorption box 15, the central adsorption box 16 and the side adsorption box 17 are all used for filling adsorption substrates;

the adsorption cavity includes a heat storage state, dry-hot gas first enters a first layer adsorption formed by the corner end adsorption box 15 and the central adsorption box 16 from the inlet cavity, and then diffuses along an airflow direction to enter a second layer adsorption formed by the side adsorption box 17 according to an air diffusion principle; the first layer adsorption and the adjacent second layer adsorption form an adsorption group; the dry-hot gas flows out of the outlet cavity after circulating and alternating through a plurality of adsorption groups.

The vacuum heat insulation layer 13 is composed of a double-layer stainless steel structure, and a middle cavity of the double-layer stainless steel is under vacuum negative pressure.

The adsorption box fixing layer includes a plurality of baffles perpendicular to the inner wall of the vacuum heat insulation layer;

the inner cavity of the vacuum heat insulation layer 13 is a regular polygon structure;

the corner end adsorption box 15 is arranged at an included angle of adjacent inner walls of the vacuum heat insulation layer 13, and the corner end adsorption box 15 is fixedly arranged between the two baffles with a shortest distance between the adjacent inner walls of the vacuum heat insulation layer 13.

One side of a plurality of corner end adsorption boxes 15 close to a center of the inner cavity of the vacuum heat insulation layer 13 is fixedly provided with the central adsorption box 16 through the baffle; and the central adsorption box 16 and the corner end adsorption boxes 15 are arranged on a same end face; a peripheral wall of the central adsorption box 16 is sequentially staggered and crossed with a side adsorption box 17 through the baffles.

Each side of the corner end adsorption box 15, the central adsorption box 16 and the side adsorption box 17 is a hollow metal mesh surface.

The staggered and crossed heat storage adsorption bed also includes an exothermic state, wherein wet air first enters the first layer adsorption formed by the corner end adsorption box 15 and the central adsorption box 16 from the inlet cavity, then enters second layer adsorption formed by the side adsorption box 17, and flows out of the outlet cavity after circulating and alternating through a plurality of adsorption groups.

Figure 2:
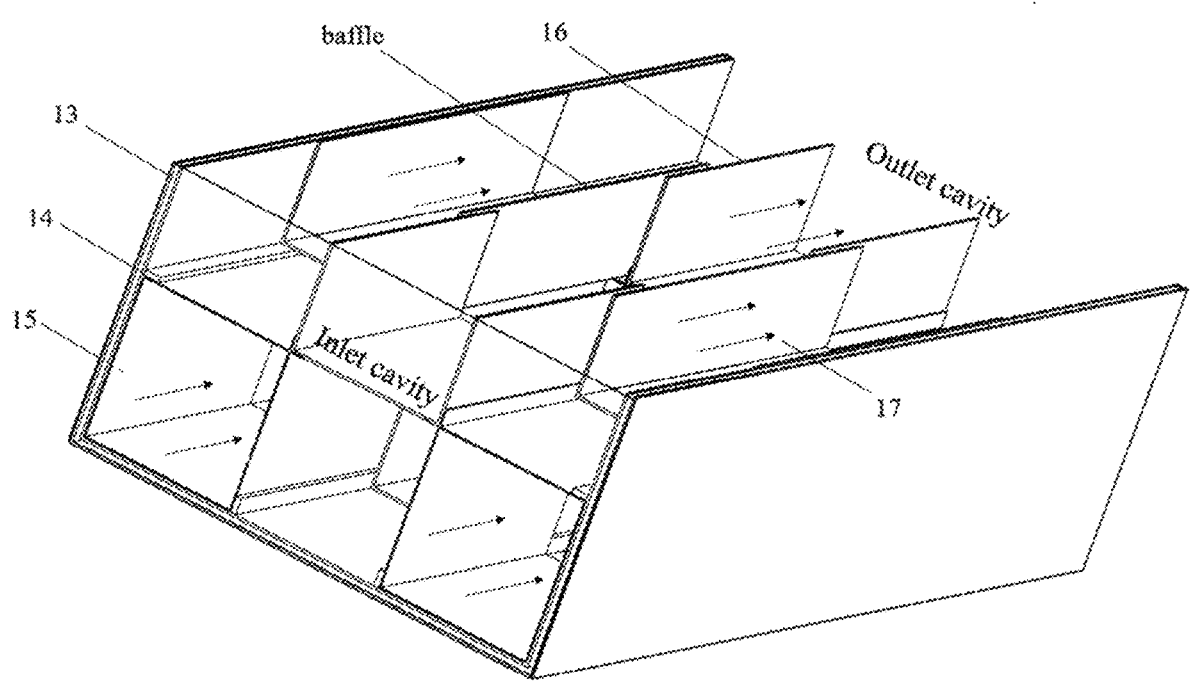
FIG. 2 is a central sectional view of the adsorption cavity of the present application.
Figure 3:
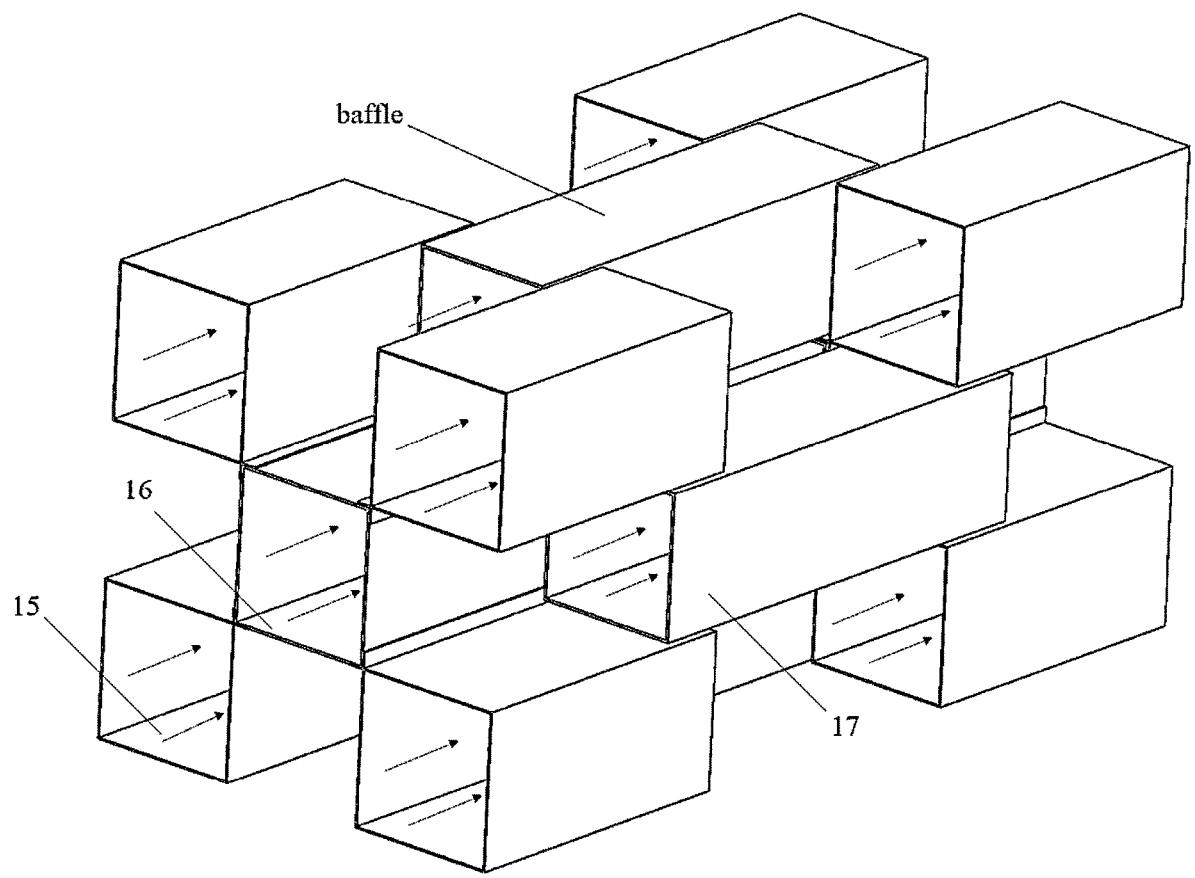
FIG. 3 is a layout diagram of each adsorption box in the adsorption cavity of the present application.

In one embodiment of the present application, as shown in FIG. 2 and FIG. 3, the vacuum heat insulation layer 13 in the adsorption cavity of the staggered and crossed heat storage adsorption bed is square, and the corner end adsorption box 15, the central adsorption box 16 and the side adsorption box 17 are also square.

Further, the installation mode of staggered and crossed adsorption bed is as follows:

the vacuum heat insulation layer 13 and the adsorption box fixing layer 14 are nested and combined, and the corner end adsorption boxes 15 is fixed to the corner ends through the baffles of the adsorption box fixing layer 14. When the four corner end adsorption boxes 15 are arranged, a central fixing bin is formed, and the central adsorption box 16 is fixed to the central fixing bin. The side adsorption box 17 is fixed by the side strip baffle, and the initial position is about one third behind the corner adsorption box 15. The installation method of the rear adsorption box is the same as above, and adsorption boxes with different sizes and quantities may be adopted according to specific needs. The rear ends of the adsorption boxes may be opened and closed, and are used for filling adsorption substrates and adsorption materials.

In one embodiment of the present application, in the heat storage stage, dry hot gas enters the thermochemical heat storage adsorption cavity through the inlet cavity, and first flows through the first layer adsorption cavity composed of four corner end adsorption boxes 15 and a central adsorption box 16. During this process, each adsorption box has at least three sides (front and two sides not attached to the inner wall of the vacuum heat insulation layer 13) to participate in the reaction, and the central adsorption box 16 has five sides (front and four sides) to participate in the reaction. After passing through the first layer adsorption cavity, the dry-hot gas passes through the second adsorption cavity composed of the side adsorption box 17, at which time four sides of the side adsorption box 17 participate in the reaction. In particular, the first layer adsorption cavity and the second layer adsorption cavity are staggered arranged, which may effectively slow down the flow rate of gas, enhance the heat storage efficiency and increase the full utilization of the adsorption bed space. In particular, the following layers of adsorption cavities are arranged in the same way as the first layer adsorption cavity and the second layer adsorption cavity and appear alternately, and the number of cycles of adsorption cavities may be determined according to the actual situation.

In the exothermic stage, the flowing path of the wet air is the same as that of the dry-hot gas in the heat storage stage. Especially, because wet air carries a large amount of moisture and combines with adsorption matrix to produce condensation, it will hinder the reaction rate. Staggered and crossed adsorption boxes may divide the adsorption matrix regularly, and the thermochemical heat storage process may be completed before the adsorption matrix condenses, which may effectively reduce the situation that water vapor condensation hinders the reduction of thermochemical reaction rate.

In one embodiment of the present application, the vacuum heat insulation layer 13 has a length of 200 mm and a thickness of 3-5 mm, and the hollow negative pressure vacuum chamber has a thickness of 2-3 mm; the adsorption box fixing layer has a length of 200 mm and a thickness of 2 mm; the baffle has a length of 200 mm, a thickness of 3 mm and a width of 1 mm; the corner end adsorption box 15 has a length of 60 mm, a width of 30 mm and a height of 30 mm; the central adsorption box 16 has a length of 60 mm, a width of 30 mm and a height of 30 mm; the side adsorption box 17 has a length of 90 mm, a width of 30 mm and a height of 30 mm; the thickness of each surface of the adsorption box is 1 mm, six surfaces are hollow mesh surfaces, and the back surface may be opened and closed; specially, for example, the baffle at the corner end adsorption box 15 is 3 mm in length and 1 mm in thickness.

A seawater desalination waste heat storage system, including a solar seawater distiller 2, a condenser 4, a condensed water storage device 5, an atomizer 7 and an adsorption bed 12; the adsorption bed 12 is a staggered and crossed heat storage adsorption bed.

A front end of the solar seawater distiller 2 is fixedly connected with a first fan 1, and a tail end of the solar seawater distiller 2 is communicated with a front end of the condenser 4; a front end outside a condenser tube of the condenser 4 is also communicated with a second fan 3; an out tail end of the condenser tube of the condenser 4 is communicated with the inlet cavity of the adsorption bed 12 through a first pipeline;

The condenser tube of the condenser 4 extend into the condensed water storage device 5; the condensed water storage device 5 is communicated with the atomizer 7 through a switch valve 6; the atomizer 7 is communicated with the inlet cavity of the adsorption bed 12 through a second pipeline.

A first flow regulating valve 10 and a first flowmeter 11 are arranged on the first pipeline.

A second flow regulating valve 8 and a second flowmeter 9 are arranged on the second pipeline.

In one embodiment of the present application, as shown in FIG. 1, a connection mode of distilled water flow pipeline of seawater desalination waste heat storage system is as follows: the first fan 1 is connected with the solar seawater distiller 2, the solar seawater distiller 2 is connected with the condenser 4, the end of the condenser 4 is connected with a water collecting port, and the water collecting port is connected with a condensed water storage device, and the condensed water storage device 5 is connected with an atomizer 7 through a switch valve 6, and the atomizer 7 is connected with the adsorption bed 12 through a second flow regulating valve 8 and a second flowmeter 9, and the front end of the adsorption bed 12 is connected with a Y-shaped pipeline.

Connection mode of heat transfer air flow pipeline is as follows: the second fan 3 is connected with the condenser 4, and the condenser 4 is connected with the adsorption bed 12 through the first flow regulating valve 10 and the first flowmeter 11, and the front end of the adsorption bed 12 is connected with a Y-shaped pipeline.

Further, when the two pipelines are used, the adsorption matrix and adsorption materials are filled into various adsorption boxes, and the adsorption boxes are fixed with the adsorption box fixing layer 14 according to the above method, and the combined adsorption cavity is nested with the vacuum heat insulation layer 13 to complete the assembly. The assembled adsorption bed may be connected to the seawater desalination waste heat storage system.

In the heat storage stage of the seawater desalination waste heat storage system, after the system is connected according to the use method, the solar heating plate is preheated for 10 min, and then the first fan 1 and the second fan 3 are respectively turned on. The first fan 1 sends the distilled water vapor to the condenser 4 for condensation, and the condensed water enters the condensed water storage device 5 and is introduced into the atomizer 7 by controlling the switch valve 6.

The second fan 3 blows air into the condenser 4 as a coolant, and at this time, the air is heated by the heat emitted by water vapor, and the hot air is introduced into the adsorption bed 12 by controlling the first flow regulating valve 10 of the pipeline.

In the exothermic stage, the first flow regulating valve 10 is closed, the switch valve 6 and the atomizer 7 are turned on, and the second flow regulating valve 8 is adjusted.

In one embodiment of the present application, during the condensation process, the residual heat generated by steam condensation heats the air in the condenser 4, and the heated air enters the adsorption bed through the first pipeline for thermochemical heat storage. In the exothermic process, the condensed water in the atomizer 7 is atomized and then enters the adsorption bed for exothermic process.

In one embodiment of the application, compared with sensible heat storage and latent heat storage, thermochemical heat storage has extremely high theoretical heat storage density, negligible heat loss and seasonal heat storage potential. In sensible heat storage, the heat storage density is low, only about 0.2 $GJ/m^3$, which has the largest storage capacity demand, large heat loss, simplicity, high reliability and low maintenance and installation cost. The commonly used heat storage medium in commerce is water, which is widely used in housing and industry. Latent heat storage stores energy through phase change materials, and the energy storage density is moderate, generally 0.3-0.5 $GJ/m^3$, which provides a relatively compact and cost-effective storage scheme. The main limitations of the latent heat storage are low thermal conductivity, volume expansion of storage medium when phase change occurs, corrosion compatibility, supercooling, phase segregation and material degradation. Thermochemical energy storage stores energy through thermochemical materials, with a high energy storage density of 0.5-3 $GJ/m^3$, and almost no energy loss during storage, which is suitable for short-term and long-term storage. Meanwhile, the outer layer of the adsorption bed is wrapped with vacuum heat insulation layer, which may effectively reduce unnecessary heat loss.

In the description of the present application, it is to be understood that the terms "longitudinal", "transverse", "up", "down", "front", "back", "left", "right", "vertical", "horizontal", "top" and "bottom", "vertical", "horizontal", "top", "bottom", "inside", "outside", etc. indicate orientations or positional relationships based on those shown in the accompanying drawings, which are intended only to facilitate the description of the application and do not indicate or imply that the device or element referred to must have a particular orientation, be constructed and operated in a particular orientation, and are therefore not to be construed as a limitation.

The above-mentioned embodiments only describe the preferred mode of the application, and do not limit the scope of the application. Under the premise of not departing from the design spirit of the application, various modifications and improvements made by ordinary technicians in the field to the technical scheme of the application shall fall within the protection scope determined by the claims of the application.

What is claimed is:

1. A staggered and crossed heat storage adsorption bed, comprising a bed body, wherein an adsorption cavity is arranged in the bed body; two sides of the adsorption cavity are respectively communicated with an inlet cavity and an outlet cavity; the adsorption cavity comprises a vacuum heat insulation layer arranged at an outermost side; and the vacuum heat insulation layer is embedded with an adsorption box fixing layer inside;

a corner end adsorption box, a central adsorption box and a side adsorption box are staggered and crossed arranged in an inner cavity of the vacuum heat insulation layer through the adsorption box fixing layer; and the corner end adsorption box, the central adsorption box and the side adsorption box are all used for filling adsorption substrates;

the adsorption cavity comprises a dry-hot gas first enters a first layer adsorption formed by the corner end adsorption box and the central adsorption box from the inlet cavity, and then diffuses along an airflow direction to enter a second layer adsorption formed by the side adsorption box; the first layer adsorption and the second layer adsorption adjacent to it form an adsorption group; the dry-hot gas flows out of the outlet cavity after circulating and alternating through a plurality of adsorption groups;

the adsorption box fixing layer comprises a plurality of baffles perpendicular to an inner wall of the vacuum heat insulation layer; and the inner cavity of the vacuum heat insulation layer is a regular polygon structure; the corner end adsorption box is arranged at an included angle of adjacent inner walls of the vacuum heat insulation layer, and the corner end adsorption box is fixedly arranged between two baffles with the shortest distance between the adjacent inner walls of the vacuum heat insulation layer; a shared side of a plurality of corner end adsorption boxes closest to the center of the inner cavity of the vacuum heat insulation layer is fixedly provided with the central adsorption box through the baffle; and the central adsorption box and the corner end adsorption boxes are arranged on a same end face; a peripheral wall of the central adsorption box is sequentially staggered and crossed with a side adsorption box through the baffles; each side of the corner end adsorption box, the central adsorption box and the side adsorption box is a hollow metal mesh surface.

2. The staggered and crossed heat storage adsorption bed according to claim 1, wherein the vacuum heat insulation layer is composed of a double-layer stainless steel structure, and a middle cavity of the double-layer stainless steel is under vacuum negative pressure.

3. The staggered and crossed heat storage adsorption bed according to claim 1, wherein air first enters the first layer adsorption formed by the corner end adsorption box and the central adsorption box from the inlet cavity, then enters the second layer adsorption formed by the side adsorption box, and flows out of the outlet cavity after circulating and alternating through a plurality of groups.

4. A seawater desalination waste heat storage system, comprising a solar seawater distiller, a condenser, a condensed water storage device, an atomizer and an adsorption bed; wherein the adsorption bed is a staggered and crossed heat storage adsorption bed as claimed in claim 1.

5. The seawater desalination waste heat storage system according to claim 4, wherein a front end of the solar seawater distiller is fixedly connected with a first fan, and a tail end of the solar seawater distiller is communicated with a front end of the condenser; a front end outside a condenser tube of the condenser is also communicated with a second fan; and an outside tail end of the condenser tube of the condenser is communicated with the inlet cavity of the adsorption bed through a first pipeline; and the condenser tube of the condenser extends into the condensed water storage device; the condensed water storage device is communicated with the atomizer through a switch valve; and the atomizer is communicated with the inlet cavity of the adsorption bed through a second pipeline.

6. The seawater desalination waste heat storage system according to claim 5, wherein a first flow regulating valve and a first flowmeter are arranged on the first pipeline.

7. The seawater desalination waste heat storage system according to claim 5, wherein a second flow regulating valve and a second flowmeter are arranged on the second pipeline.

\* \* \* \* \*